US008935437B2

(12) United States Patent
Lambert et al.

(10) Patent No.: US 8,935,437 B2
(45) Date of Patent: Jan. 13, 2015

(54) PERIPHERAL COMPONENT HEALTH MONITORING APPARATUS

(75) Inventors: Timothy Michael Lambert, Austin, TX (US); Pedro Lopez, Austin, TX (US); Jinsaku Masuyama, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 783 days.

(21) Appl. No.: 11/424,163

(22) Filed: Jun. 14, 2006

(65) Prior Publication Data

US 2008/0005377 A1    Jan. 3, 2008

(51) Int. Cl.
| | |
|---|---|
| *G06F 3/00* | (2006.01) |
| *G06F 13/00* | (2006.01) |
| *G06F 1/26* | (2006.01) |
| *G06F 11/07* | (2006.01) |
| *G06F 11/30* | (2006.01) |
| *G06F 11/34* | (2006.01) |

(52) U.S. Cl.
CPC ............ *G06F 1/266* (2013.01); *G06F 11/0727* (2013.01); *G06F 11/0784* (2013.01); *G06F 11/3041* (2013.01); *G06F 11/3055* (2013.01); *G06F 11/3082* (2013.01); *G06F 11/3476* (2013.01)
USPC ........................................... 710/15; 710/302

(58) Field of Classification Search
None
See application file for complete search history.

(56) References Cited

U.S. PATENT DOCUMENTS

| | | | |
|---|---|---|---|
| 3,729,671 | A * | 4/1973 | Jeffery et al. ............. 363/50 |
| 5,612,854 | A | 3/1997 | Wiscombe et al. |
| 5,691,879 | A | 11/1997 | Lopez et al. |
| 6,021,047 | A | 2/2000 | Lopez et al. |
| 6,040,982 | A | 3/2000 | Gandre et al. |
| 6,049,451 | A | 4/2000 | Schmitt et al. |
| 6,088,222 | A | 7/2000 | Schmitt et al. |
| 6,247,079 | B1 | 6/2001 | Papa et al. |
| 6,418,492 | B1 | 7/2002 | Papa et al. |
| 6,581,190 | B1 | 6/2003 | Dixon et al. |
| 6,634,889 | B2 | 10/2003 | Miller et al. |
| 6,640,282 | B2 | 10/2003 | MacLaren et al. |
| 6,684,292 | B2 | 1/2004 | Piccirillo et al. |
| 6,766,469 | B2 | 7/2004 | Larson et al. |
| 6,785,142 | B1 | 8/2004 | Regimbal et al. |
| 6,785,785 | B2 | 8/2004 | Piccirillo et al. |
| 6,785,835 | B2 | 8/2004 | MacLaren et al. |
| 6,854,070 | B2 | 2/2005 | Johnson et al. |
| 6,892,271 | B2 | 5/2005 | Piccirillo et al. |
| 6,931,458 | B2 | 8/2005 | Bolian et al. |
| 6,968,466 | B2 | 11/2005 | Bolian et al. |
| 6,973,598 | B2 | 12/2005 | Masuyama et al. |

(Continued)

OTHER PUBLICATIONS

Robert Kando, Hot Plug PCIExpress Server Input Output Module (SIOM), Application Report, SLUA362—Sep. 2005, pp. 1-6.

*Primary Examiner* — Idriss N Alrobaye
*Assistant Examiner* — Richard B Franklin
(74) *Attorney, Agent, or Firm* — Baker Botts L.L.P.

(57) ABSTRACT

An apparatus for monitoring the health of a peripheral component of an information handling system. An aggregation logic circuit coupled to a communication path provides data communication with each of a plurality of electrical circuits disposed on the peripheral component, the aggregation logic circuit providing a feedback signal representative of the health of the peripheral component during operation of the peripheral component.

13 Claims, 5 Drawing Sheets

(56) References Cited

U.S. PATENT DOCUMENTS

| | | |
|---|---|---|
| 6,981,095 B1 | 12/2005 | MacLaren et al. |
| 6,981,239 B2 | 12/2005 | Masuyama et al. |
| 7,010,652 B2 | 3/2006 | Piccirillo et al. |
| 7,028,213 B2 | 4/2006 | Majni et al. |
| 7,111,059 B1 * | 9/2006 | Garcea et al. ................. 709/224 |
| 7,426,347 B2 * | 9/2008 | Hnatiw et al. .................. 398/38 |
| 2006/0259815 A1 * | 11/2006 | Graham et al. .................. 714/11 |
| 2007/0028148 A1 * | 2/2007 | Kulidjian et al. ............... 714/47 |

* cited by examiner

PERIPHERAL COMPONENT HEALTH MONITORING APPARATUS

BACKGROUND

1. Technical Field

The present disclosure generally relates to apparatuses, methods and products in the field of information handling systems.

2. Background Information

As the value and use of information continues to increase, individuals and businesses seek additional ways to process and store information. One option available to users is an information handling system. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

The following presents a general summary of several aspects of the disclosure in order to provide a basic understanding of at least some aspects of the disclosure. This summary is not an extensive overview of the disclosure. It is not intended to identify key or critical elements of the disclosure or to delineate the scope of the claims. The following summary merely presents some concepts of the disclosure in a general form as a prelude to the more detailed description that follows.

One aspect of the disclosure provides an apparatus for monitoring the health of a peripheral component of an information handling system. An aggregation logic circuit coupled to a communication path provides data communication with each of a plurality of electrical circuits disposed on the peripheral component, the aggregation logic circuit providing a feedback signal representative of the health of the peripheral component during operation of the peripheral component.

Another aspect provides an apparatus having a platform and a platform controller for receiving a feedback signal from an aggregation logic circuit coupled to a communication path for data communication with a plurality of electrical circuits disposed on a peripheral component. The feedback signal may be indicative of the health of the peripheral component, and the platform controller generates a platform control signal based at least in part on the received feedback signal.

Another aspect provides a method of monitoring the health of an information handling system peripheral component having a plurality of electrical circuits. The method may include monitoring the plurality of electrical circuits using an aggregation logic circuit, the aggregation logic circuit being in data communication with each of the plurality of electrical circuits, and generating a feedback signal representative of the health of the peripheral component during operation of the peripheral component, the feedback signal being based at least in part on an output of the aggregation logic circuit.

Yet another aspect includes a computer-readable medium having stored thereon a data structure. The data structure may include a first field containing data representing the health of a first electrical circuit and a second field containing data representing the health of a second electrical circuit. The first electrical circuit and the second electrical circuit may reside on a peripheral component of an information handling system.

Still another aspect provides a peripheral component apparatus. The apparatus may include a plurality of electrical circuits and an aggregation logic circuit in data communication with each of the plurality of electrical circuits. The aggregation logic circuit provides data representative of the health of the plurality of electrical circuits during operation of the apparatus. The apparatus further includes an interface for transmitting the data.

Another aspect provides an information handling system apparatus. The apparatus includes a platform, a peripheral component, and an interface that places the platform and the peripheral in data communication. The apparatus according to this aspect further includes a plurality of electrical circuits disposed on the peripheral component and an aggregation logic circuit in data communication with each of the plurality of electrical circuits, the aggregation logic circuit providing data representative of the health of the plurality of electrical circuits during operation of the peripheral component.

A further aspect of the present disclosure provides for an apparatus for monitoring the health of a peripheral component of an information handling system. The apparatus includes an aggregation logic circuit in communication with each of a plurality of electrical circuits disposed on the peripheral component, the aggregation logic circuit operable to provide a feedback signal. Furthermore, the apparatus includes a platform controller in communication with the aggregation logic circuit. The platform controller may be operable to generate a platform control signal. The apparatus further includes a plurality of power rails in communication with the plurality of electrical circuits and the aggregation logic circuit. The feedback signal is representative of an aggregation of power goods asserted by the plurality of power rails, and the platform control signal removes power from the peripheral component if at least one of the plurality of power rail fails to assert a power good.

BRIEF DESCRIPTION OF THE DRAWINGS

For detailed understanding of the present disclosure, references should be made to the following detailed description of the several aspects, taken in conjunction with the accompanying drawings, in which like elements have been given like numerals and wherein.

DESCRIPTION OF EXEMPLARY EMBODIMENTS

For purposes of this disclosure, an information handling system may include, but is not limited to, any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
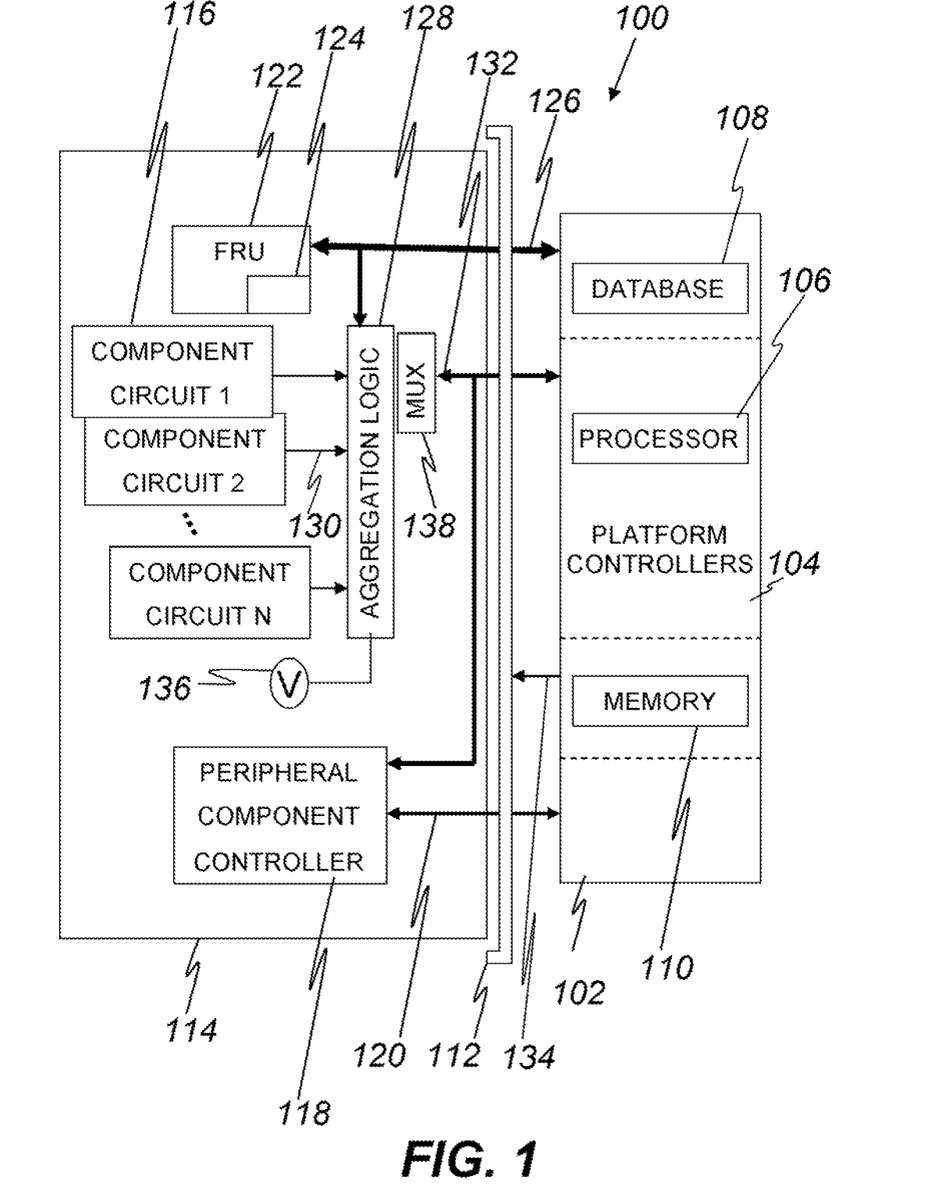
FIG. 1 schematically illustrates a non-limiting example of an information handling system having a peripheral component interface slot with a peripheral component connected to the information handling system via the interface slot.

FIG. 1 schematically illustrates a non-limiting example of an information handling system having a peripheral component interface connector with a peripheral component connected to the information handling system via the interface connector. Shown is an information handling system 100. The information handling system includes a platform 102, which may include one or more platform controllers 104. The platform 102 may further include a processor or processors 106, databases 108 and memory 110 for storing information. The platform further includes a connector 112 for receiving a peripheral component 114. The connector 112 may be any type of connector suitable for receiving a peripheral component 114.

In several aspects of the disclosure, the connector 112, which may be any suitable connector, comprises a slot connector, also called an expansion slot. The terms slot, expansion slot or slot connector are used interchangeably herein to mean a connector interface for receiving a peripheral component. In aspects, the peripheral component may be inserted into or removed from the expansion slot.

The platform 102 is configured to receive the peripheral component 114 into the expansion slot 112 without removing electrical power from the platform, although removing power first is acceptable. The term "hot swap" is used herein to include connecting and/or removing a peripheral or other component to/from the platform without first removing electrical power from the platform. The term is inclusive of replacing a peripheral component with either a like or an unlike peripheral component and is inclusive of connecting and disconnecting the same component to and from an information handling system platform.

The platform 102 may be any suitable platform comprising a portion of an information handling system. As a non-limiting example, the platform controller or controllers 104 may be a single multi-function controller or may comprise several controller circuits or planar devices as indicated by dashed lines in the figure. Likewise, as a non-limiting example, the processor 106 may be one or more processors, the database 108 may be one or more databases and the memory 110 may include several memory devices. The memory 110, may be any suitable memory, and as a non-limiting example may also be on-board or removable from the platform 102.

Referring still to FIG. 1, the peripheral component 114 may provide any number of functions typically found in current peripheral components and may include later-developed functionality. Non-limiting examples of peripheral components include host bus adapters, network interface cards, small computer system interfaces (SCSI), serial attached SCSI (SAS), and/or redundant array of independent disks, also known as redundant array of inexpensive disks (RAID) Aspects of the invention include a peripheral component 114 comprising a number (N) of peripheral component electrical circuits 116 (i.e. component circuit 1 through component electrical circuit N), a peripheral component controller 118 for controlling the peripheral component electrical circuit or circuits 116 and a data communication path 120 for communicating with the platform 102 via the connector 112. Component circuits 1 through N may be any number of component circuits for carrying out the functions of the peripheral component 114.

The peripheral component 114 may further include a field replaceable unit (FRU) 122. The FRU may comprise a memory 124. The memory 124 may be any useful memory, non-limiting examples of which include non-volatile memory. In one aspect as a non-limiting example the memory 124 is embodied in an Electrically-Erasable Programmable Read-Only Memory (EEPROM). In aspects of the invention, the FRU 122 may communicate with circuits on the peripheral component 114. In aspects of the invention, the FRU 122 may communicate with the platform 102 and with circuits on the peripheral component via any suitable component, non-limiting examples of which include a bus, such as a bus 126 as shown. In the non-limiting example as shown, bus 126 comprises a multi-directional bus for communicating information between the peripheral component and the platform.

An aggregation logic circuit 128 is in data communication with each of the component circuits 116 via data communication paths 130. Data communication paths 130 may include any suitable data communication path including, but not limited to, electrically conductive traces or wires, infrared paths, visible light paths, optic fibers, electromagnetic or radio wave paths or any combination of these or equivalent paths. In one aspect, the paths 130 include an electrically conductive path. The aggregation logic circuit 128 may communicate with other components on the peripheral component 114 and with the platform 102 over one or more data communication paths 132. Data communication paths 132 may include any suitable data communication path including, but not limited to, electrically conductive traces or wires, infrared path, visible light path, optic fiber, electromagnetic or radio wave paths. In one aspect, the path 132 includes an electrically conductive path. The aggregation logic circuit may communicate with the platform 102 and with the peripheral component controller 118 via path or bus 132 and may also communicate with the platform and with the FRU 122 via bus 126. As mentioned above with respect to paths 130 and 132, path or bus 126 may include any suitable path or bus or combination including, but not limited to, electrically conductive traces or wires, infrared path, visible light path, optic fiber, electromagnetic or radio wave paths. In one aspect, the path 126 includes an electrically conductive path. A multiplexer circuit, also called a "MUX" 138, may be used to allow bi-directional use of the bus 132 for sending a feedback signal back to the platform as described in more detail later. The multiplexer circuit 138 may be positioned anywhere convenient as desired, non-limiting examples of which include resident on the peripheral component 114 as shown or on the platform side.

Electrical power may be applied to the platform 102 for hot swap mating and de-mating the peripheral component 114. Main power may or may not be applied to the connector 112 electrical path 134 during an initial insertion event, although in some operative modes it is not. The platform senses an insertion event and initiates a reset to the peripheral component 114. As non-limiting description of operation, should there be a problem with the peripheral component or with the insertion, a signal on one of the communication paths, say path 132, signifies that an error has been detected and another reset may be issued or the platform controller may be used to declare a failure. The platform controller may or may not be programmed to allow a predetermined number of resets. Should the reset or resets remain unsuccessful, any number of decisions regarding power may be made, including but not limited to: power not being applied to the connector slot 112; power being partially supplied; or power being controlled or varied in some manner. The term error may include any or all of any problem or condition comprising a detected state, level or condition that is either predetermined to be or determined during operation to be an unexpected or ambiguous state, a level outside a predetermined upper or lower limit or high/low range or an unexpected or otherwise abnormal operating condition. Error information may be treated/handled in any manner as desired. As a non-limiting example, error information may be recorded on a platform log stored in the database 108 and/or in the memory 110. As another non-limiting example, error information may also be recorded on the peripheral component FRU 122 for subsequent testing at the FRU manufacturer/supplier. During operation is used herein to include a period of time after a peripheral component insertion and initial reset is successful and the peripheral component connector power is activated or powered, and may also include other periods such as after successful power up of the peripheral.

A successful insertion event results in a reset to the peripheral component, and a reset signal on communication path 132 goes inactive for normal operation and the peripheral component is ready for power. The platform controller may then apply power to the connector and thus to the peripheral component 114 via the primary power bus 134. Inactive refers to a state or level on the communication path indicating a successful insertion event, which state or level may be, but is not limited to, a current, a voltage or data in the form of a binary or other signal.

The aggregation logic circuit 128 is in data communication during operation with each of several circuits on the peripheral component 114 for determining health of the peripheral component during operation. The term health is used to mean the operational condition of a part or the whole of the peripheral component. The operational condition may be within acceptable limits or range, or the health may be outside an acceptable limit or range. The term health also includes the state of non-operational. The term health may also include any other parameter relating to the peripheral which is desirable to monitor. An output signal from the aggregation logic is transmitted back to the platform as a feedback signal indicating whether signals from all paths from the component circuits are within acceptable limits or bands. Should any component circuit fail to operate within predetermined limits, the feedback signal indicates the existence of such a problem. The feedback signal is based at least in part on the component circuit signal on the pathway 130 communicating with the aggregation logic. The aggregation logic may include any logic device or combination of logic devices suitable to provide an output signal indicating that signals from all paths from the component circuits are within acceptable limits or bands. The aggregation logic circuit 128 may include a latch circuit, OR gates, AND gates, NAND gates, NOR gates, inverter or NOT gates, or any other gate or combination of logic gates suitable given the component circuits monitored by the aggregation logic circuit 128.

In one aspect, data/information from each of the component circuits is communicated to the aggregation logic circuit via the pathway 130 to monitor the health of the peripheral component 114. Data/information received by the aggregation logic circuit is combined to form an output, which may be the feedback signal or which may be conditioned, digitized, converted, filtered or otherwise modified to become the feedback signal.

The platform controller 104 receiving the aggregation circuit feedback signal may then operate to generate a platform control signal. Any detected error may be handled in any manner as desired, a non-limiting example of which includes logging the error as error information into a system event log, which may be stored in the memory 110 and/or the database 108. As another non-limiting example, the error information may also be or in the alternative transmitted to the FRU memory 124. The stored error information may include selected information for use in troubleshooting the peripheral component, as well as any other information as desired. In one non-limiting aspect, the error information includes information identifying the particular pathway 130 receiving the initial error. The error information may be in the form of an address. In another non-limiting aspect, the error information may include component circuit identifying information, such as an address or component code. In even another aspect, the error information may further, or alternatively, include information about the condition detected, such as out of range high or low. Any information useful in later troubleshooting the peripheral component may be recorded.

As non-limiting operating examples, the platform control signal may be used to remove power from the connector 112 upon receiving from the aggregation logic the feedback signal indicating the detected error condition, or the platform control signal may be used for other control purposes. The logging and/or recording the error information may be performed subsequent to, prior to or substantially simultaneously with the power down. In practice, the power down is performed quickly enough to avoid damage to the platform 102 and/or further damage to the peripheral component or to the platform itself.

Power for operating the aggregation logic circuit on the peripheral component 114 may come from any suitable source, non-limiting examples of which include the platform 102 via an auxiliary power pin on the connector 112 or the power may be resident on the peripheral component 114 in the form of a battery or other power source 136.

Figure 2:
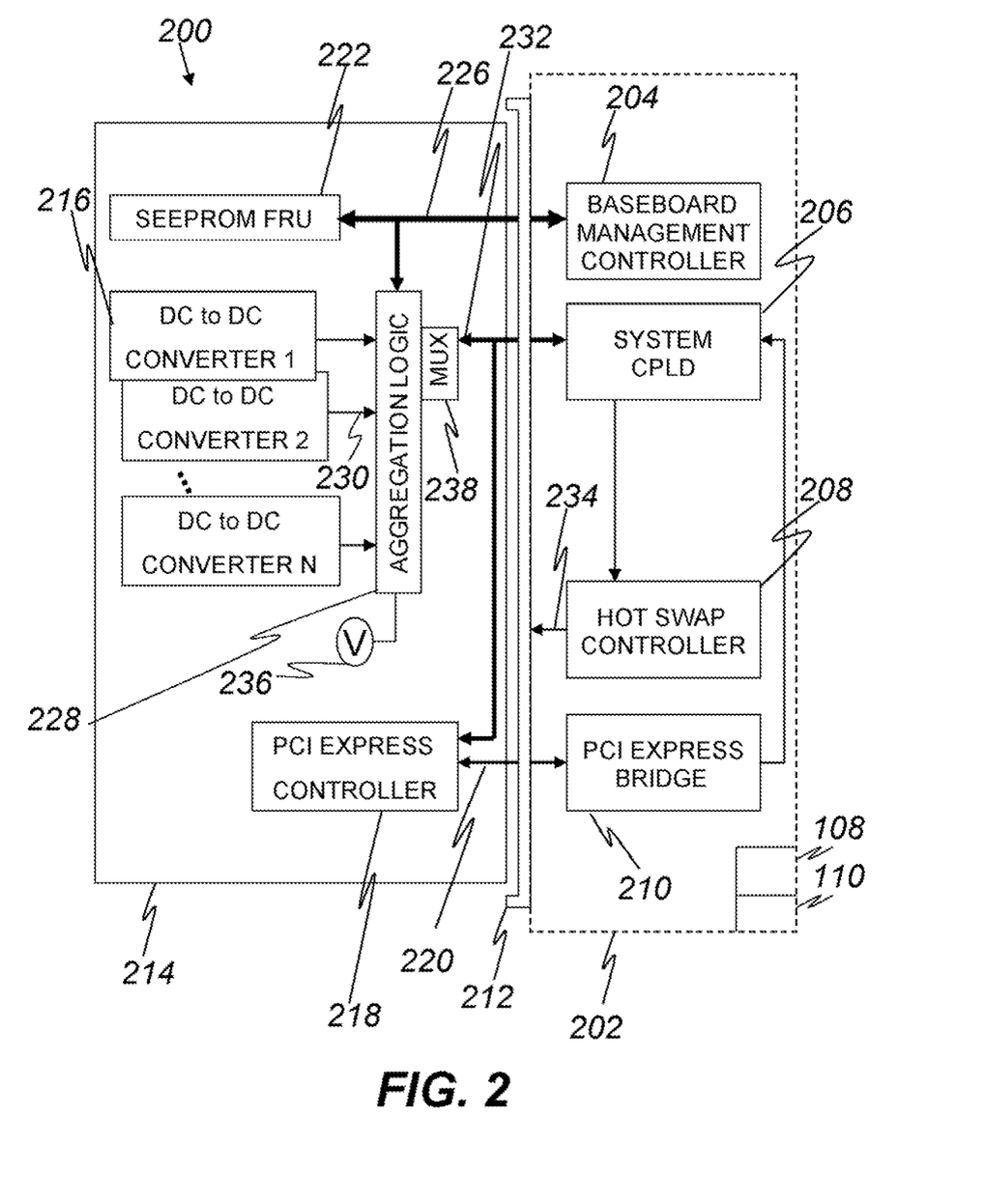
FIG. 2 schematically illustrates a non-limiting example of an information handling system having a peripheral component interface slot with a PCI express compliant peripheral component connected to the information handling system via the interface slot.

FIG. 2 schematically illustrates a non-limiting examples of an information handling system 200 having a peripheral component interconnect (PCI) slot with a PCI express compliant peripheral component connected to the information handling system via the interface slot. The phrase "PCI express compliant peripheral component" is also referred to as a PCIe card, a PCI express card, a PCIe adapter, and PCI express adapter. Those skilled in the art would recognize that these terms are interchangeable and mean any peripheral component compliant with a PCI Express standard and/or any addendum or change thereto.

The information handling system 200 may include a platform 202, which may include one or more platform controllers such as a baseboard management controller (BMC) 204, a system Complex Programmable Logic Device (CPLD) 206, a hot-swap controller 208, and a PCI express Bridge 210. The platform 202 may further include a processor or processors, databases 108 and memory 110 for storing information, such as those described above and shown in FIG. 1. The processors, databases and memory devices may be included in any or all of the BMC, system CPLD, hot-swap controller and/or PCI Express bridge or may be on the platform 202 in another location.

In aspects of the disclosure, the platform 202 further includes a connector 212 for receiving a peripheral component, such as a PCI express card 214. The connector 212 comprises a slot connector or expansion slot for receiving the PCI express card. In aspects, the PCI express card may be inserted into or removed from the expansion slot 212.

The platform 202 is configured for hot swap to receive the PCI express card 214 into the expansion slot 212 without removing electrical power from the platform 202.

The platform 202 may be any platform comprising a portion of an information handling system. The BMC 204, CPLD 206, hot-swap controller 208 and PCI express bridge 210 may be a single multi-function application-specific integrated circuit (ASIC) or may comprise several controller circuits or planar devices.

Continuing with FIG. 2, the PCI express card 214 may provide any number of functions typically or found in current peripheral components and may include later-developed functionality. Aspects of the invention include a PCI express card 214 comprising a number (N) of component circuits such as DC to DC converters 216 (i.e. DC to DC converter 1 through DC to DC converter N). A PCI express controller 218 controls the PCI express card 214. A communication path 220 provides communication with the platform 202 via the connector 212.

As a non-limiting example, the PCI express card 214 may be any number of useful adapter cards, so long as the card incorporates the invention disclosed herein. Original equipment manufacturers (OEMs) can become capable of producing peripheral components incorporating the present invention given the present disclosure. Therefore, the PCI express card 214 may comprise a host bus adapter (HBA), which may me a fiber channel HBA or infiniband HBA. The PCI express card 214 may comprise a Network Interface Card (NIC). The PCI express card 214 may comprise Small Computer System Interface (SCSI) or a Serial Attached SCSI (SAS). In other aspects the PCI express card comprises a redundant array of independent disks, also known as redundant array of inexpensive disks (RAID).

The peripheral component 214 may further include a field replaceable unit (FRU) including a memory such as an electrically erasable programmable read only memory (EEPROM) or Serial EEPROM (SEEPROM) 222. As a non-limiting example, the FRU 222 may communicate with circuits on the PCI express card 214, and may communicate with the platform 202 and with circuits on the peripheral component via a bus 226, which in the non-limiting example as shown is a multi-directional bus for communicating information between the peripheral component and the platform. In one aspect, the bus 226 is a system management bus (SMBUS).

Still referring to FIG. 2, an aggregation logic circuit 228 receiving information from each of the DC to DC converters 216 via electrical paths 230. In one aspect, the paths 230 include power rails from the DC to DC converters 216. The aggregation logic circuit 228 may communicate with other components on the PCI express card 214 and with the platform 202 over one or more electrical pathways 232. The aggregation logic circuit may communicate with the platform 202 and with the PCI express controller 218 via the path or bus 232 and may also communicate with the platform 202 and with the FRU 222 via the SMBUS 226. The pathway 232 may be the same pathway from which the PCI express card receives a PCIe Reset (PERST) signal from the platform system CPLD. A multiplexer circuit 238 may be used to allow bi-directional use of the PERST line for sending the feedback signal back to the platform. The multiplexer circuit 238 may be resident on the PCI express card as shown or it may be on the platform side.

In a non-limiting example, hot-swap controller 208 is in communication with the System CPLD and generates a platform control signal for controlling power to the connector 212 via an electrical path 234.

The platform 202 senses an insertion event and initiates a reset PERST signal to the PCI express card 214. Should there be a problem with the peripheral component or with the insertion, the PERST signal on one of the communication paths, say path 232, remains active signifying a problem. As a non-limiting example, path 232 carries a feedback signal from the PCI express card to the system CPLD. The system CPLD 206 communicates with the hot-swap controller 208 and with the PCI express bridge 210. The platform 202 may be programmed to allow a predetermined number of resets. Should the reset or resets remain unsuccessful after the initial insertion event, power is not applied to the connector slot 212 to protect the PCI express card and the platform from damage. Error information is then recorded on a platform log stored on the platform database 108 and/or memory 110. The error information may be stored on the PC express FRU 222 for subsequent testing at the FRU manufacturer/supplier.

A successful insertion event may result in a reset to the peripheral component, and the PERST signal goes inactive indicating that the peripheral component is ready for power. The platform hot-swap controller 208 may then apply power to the connector and thus to the PCI express card 214.

The aggregation logic circuit 228 communicates during operation with the DC to DC converters 216. In one aspect, information from each of the DC to DC converters 216 is communicated to the aggregation logic circuit 228 via the pathway 230 for monitoring the health of the peripheral component 214. Information received by the aggregation logic circuit is combined to form an output, which may be the feedback signal or which may be conditioned, digitized, converted, filtered or otherwise modified to become the feedback signal.

As a non-limiting example, an output signal from the aggregation logic circuit is an aggregation of power goods monitored on power rails from the DC to DC converters, which output signal is transmitted back to the platform CPLD as a feedback signal indicating whether electrical signals from all monitored power rails from the DC to DC converter circuits are within acceptable limits or bands. Should any converter fail to operate within predetermined limits, the aggregation logic circuit feedback signal indicates to the platform controller the existence of an error, and a platform control signal is generated. The feedback signal is based at least in part on the component circuit signal on the pathway 230 communicating with the aggregation logic. As described above with respect to aspects shown in FIG. 1, the aggregation logic may include any logic device or combination of logic devices suitable to provide an output signal indicating that signals from all paths from the component circuits are within acceptable limits or bands. In one aspect, the aggregation logic includes one or more OR gates. On other aspects, the aggregation logic circuit 228 may include a latch circuit, OR gates, AND gates, NAND gates, NOR gates, inverter or NOT gates, or any other gate or combination of logic gates suitable given the component circuits monitored by the aggregation logic circuit to provide a desired feedback signal.

The platform CPLD or processor receiving the aggregation logic circuit feedback signal may then operate to log the problem into a system event log, which may be stored in the memory 110 and/or the database 108. The error information may be transmitted to the FRU 222. The error information recorded includes selected information for use in troubleshooting the peripheral component. In one aspect, the recorded information includes information identifying the particular pathway 130 receiving the initial error. The error information may be in the form of an address. In one aspect, the information may include component circuit identifying information, such as an address or component code. The error information may further, or alternatively, include information about the condition detected, such as out of range high or low. Any information useful in later troubleshooting the peripheral component may be recorded.

The platform hot-swap controller generates a platform control signal for removing power from the connector 212 upon receiving from the aggregation logic circuit the feedback signal indicating the detected error condition. The logging and/or recording the error information may be performed subsequent to, prior to or substantially simultaneously with the power down. In practice, the power-down is performed quickly enough to avoid damage to the platform 202 and/or further damage to the PCI express card or to the platform itself.

Power for operating the aggregation logic circuit on the PCI express card 214 may come from the platform 202 via an auxiliary power pin on the connector 212 or the power may be resident on the peripheral component 214 in the form of a battery or other power source 236.

Figure 3:
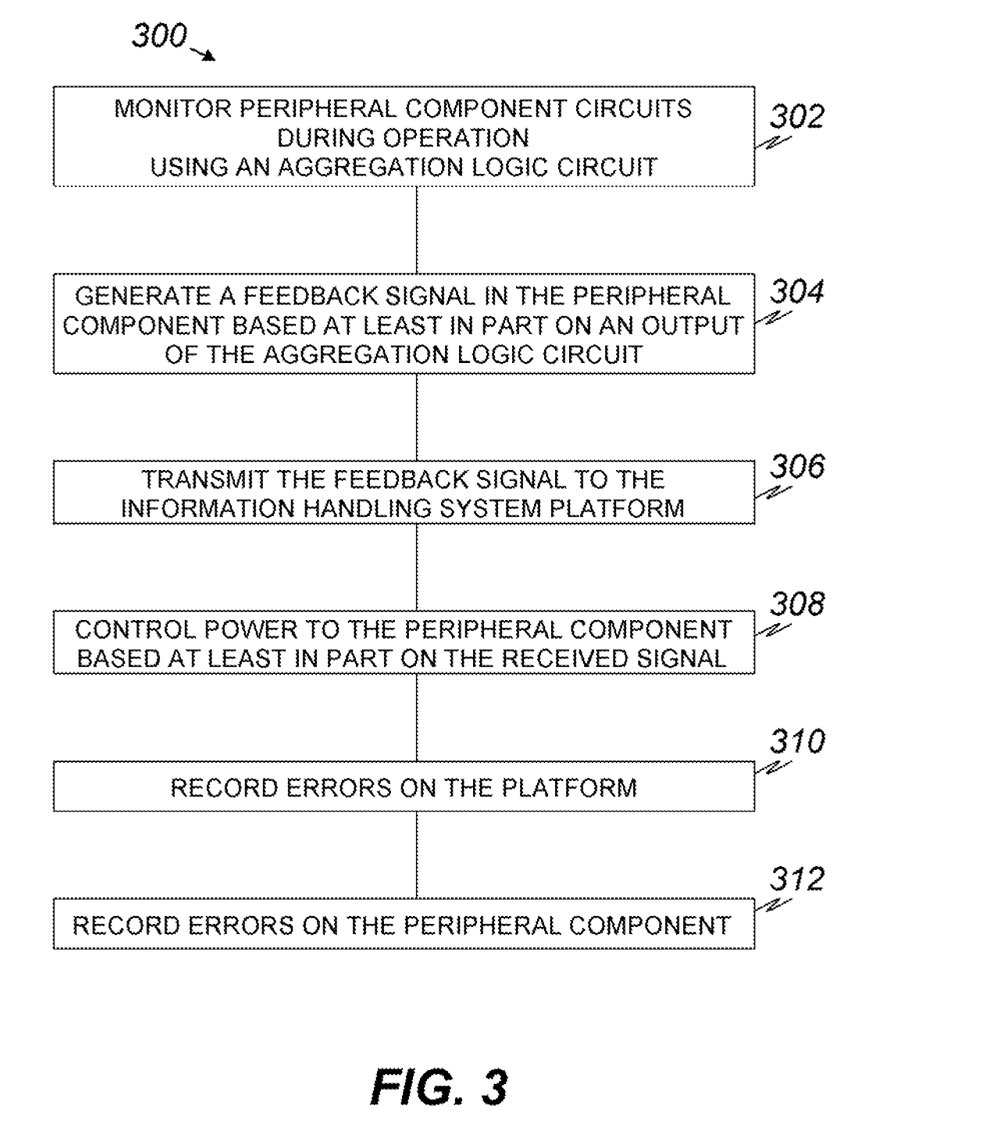
FIG. 3 illustrates a non-limiting example of a method of controlling a peripheral component.

FIG. 3 shows a flow chart of a method of controlling a peripheral component connected to an information handling system platform. In one aspect, a method 300 includes the use of a powered platform such as platform 102 or 202 described above and shown in FIGS. 1 and 2 for hot-swap of a peripheral component. Referring to FIG. 3 peripheral component circuits are monitored on the peripheral component using an aggregation logic circuit at 302. A feedback signal is generated 304 in the peripheral component, and the generated feedback signal is based at least in part on an output of the aggregation logic circuit. The feedback signal is transmitted 306 to the information handling system platform.

One or more controllers or logic circuits on the platform control power 308 to the peripheral component, the control being based at least in part on the received feedback signal. In one aspect an error such as a failed peripheral component circuit being monitored by the aggregation logic circuit causes the platform controller(s) to generate a platform control signal for removing power from the connector to which the peripheral component is connected to protect the peripheral component and the platform from harm due to the failed peripheral component circuit.

In one aspect error information may be stored or recorded 310 on the platform in a database or memory device. In another aspect, the error information may be stored or recorded 312 on a peripheral component memory device. In one aspect the error information is stored on both the platform and on the peripheral component. The stored error information may include information regarding the failed component circuit. The information may be in the form of an address. In one aspect, the information may include component circuit identifying information, such as an address or component code. The information may further, or alternatively, include information about the error condition detected, such as out of range high or low. Any information useful in later troubleshooting the peripheral component may be recorded.

Figure 4:
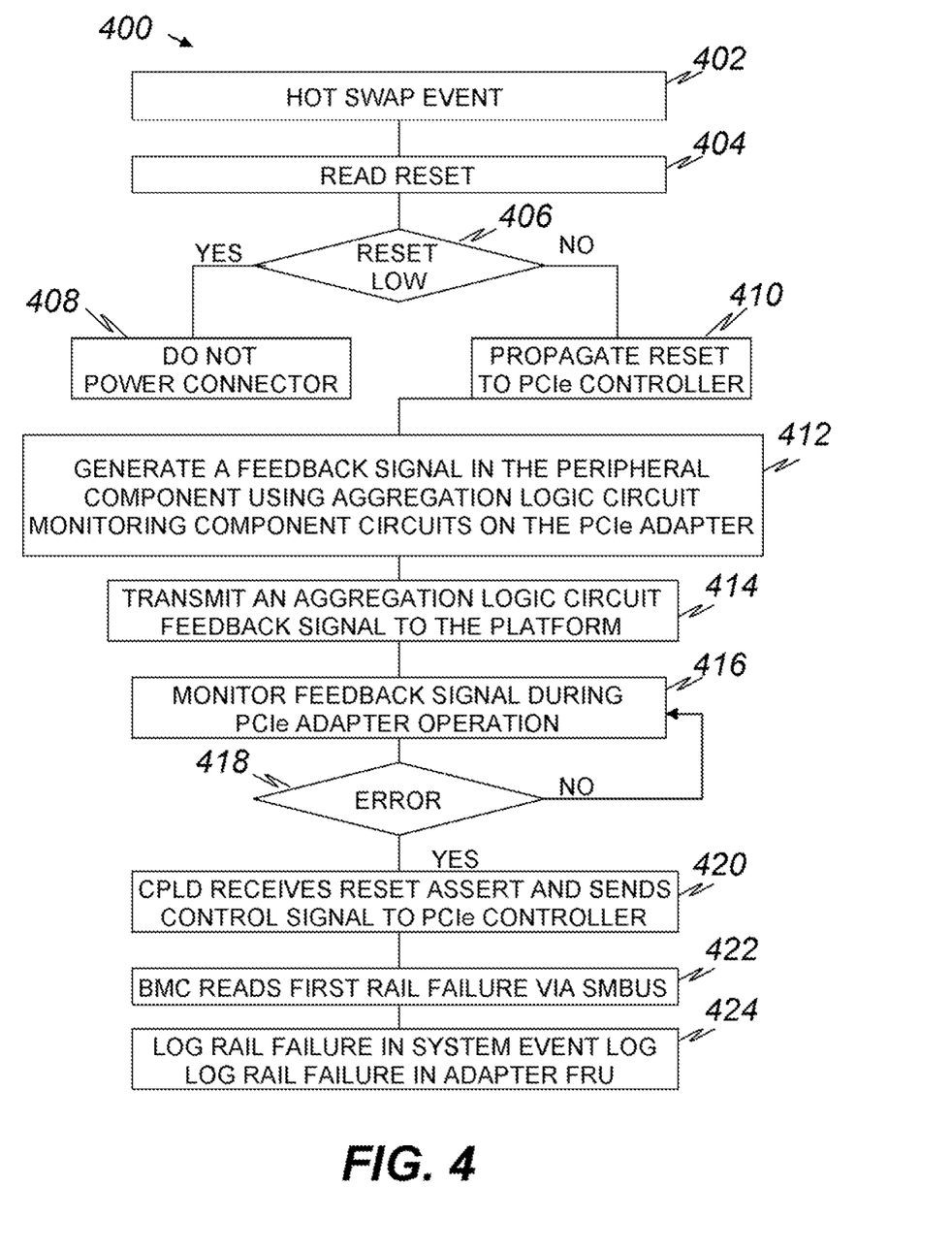
FIG. 4 illustrates a non-limiting example of a method of controlling a PCI express compliant peripheral component connected to an information handling system.

Referring now to FIG. 4, a non-limiting example of a method 400 includes a hot swap event 402 such as inserting a peripheral component into a platform expansion slot. A signal is read 404 determine presence of the peripheral component and an initial insertion event. A decision 406 is made based in part on the signal read and whether the signal indicates a problem with the initial insertion event. If there is a problem, a decision is made about power, for example, perhaps power is not applied to the connector as indicated in block 408, or power is otherwise controlled. In one aspect a predetermined number of reset cycles may be attempted prior to declaring a failure. A successful insertion event results in power applied or otherwise controlled to the expansion slot and a reset command issued 410 to the peripheral component controller.

A feedback signal is generated 412 using an aggregation logic circuit monitoring PCIe adapter circuits. As indicated at 414, the feedback signal is transmitted to the platform for monitoring the feedback signal 416 during PCIe adapter operation to determine health of the adapter. The signal is used at least in part to determine whether an error 418 exists, such as whether one of the component circuits has failed. As long as all circuits are operating within acceptable limits, then the monitoring continues.

An error condition results in a CPLD or processor on the platform receiving a reset assert 420 in the line carrying the aggregation logic circuit feedback signal used to monitor the peripheral component. A control signal is sent to the peripheral component controller to control power applied to the PCIe card.

Error information regarding the failed circuit or circuits is read 422 by the baseboard management controller via a SMBUS. The error information may be recorded 424 in the platform system event log stored on a memory device and/or a database. The error information may be transmitted to the PCIe FRU for storage and later use in troubleshooting the PCIe adapter. In one aspect, the BMC reads the first rail to fail via the SMBUS. The error information may be recorded using a data structure that facilitates troubleshooting. Various non-limiting data structure aspects of the disclosure will be further described below with reference to FIG. 5.

According to another aspect and referring to FIGS. 2 and 4, the PCIe bridge 210 or System CPLD 206 may be used to arm the hot swap controller 208. The hot plug controller, when commanded, may then apply power to the connector 212. The data communication path 232 carrying the PERST signal is monitored by the system CPLD for a tow state or level. If the PERST signal is not low after some time, then the hot swap controller is disarmed and a normal reset is asserted. Following the reset, the hot swap controller is re-armed.

According to another aspect, power is applied to the PCIe adapter DC to DC converters when power is applied from the platform hot swap controller to the connector 212 and reset is asserted. The aggregation logic circuit 228 combines the power goods existing on the power rails 230 and provides an output to the data communication path 232 as a feedback signal to the platform system CPLD 206.

Any time that the hot plug controller is armed and the reset signal is seen to change state or level, for example change from high to low, then a PCIe power fault is declared by platform controllers or the CPLD and the hot swap controller removes power to the connector 212. In one aspect, the system CPLD disarms the hot swap controller prior to a reset assert command to prevent false power removal to the connector 212.

Figure 5:
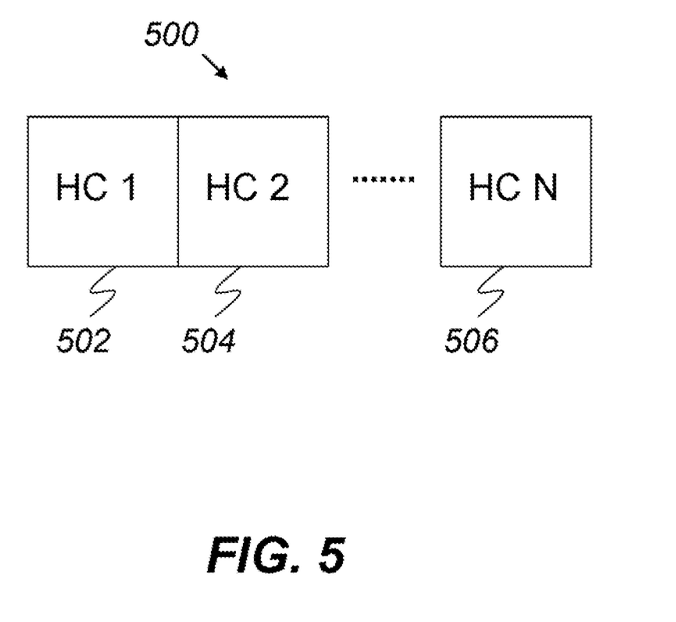
FIG. 5 illustrates a non-limiting example of a data structure for storing on a computer-readable medium data representative of the health of a peripheral component connected to an information handling system.

FIG. 5 illustrates a non-limiting example a data structure 500, which may be stored in a computer-readable media such as the FRU 122, 222, memory 108 or database 110 described above and shown in FIGS. 1-2. The data structure may include any number of fields representing the health of peripheral component electrical circuits. For example, field HC 1 502 includes data indicative of the health of peripheral component electrical circuit 1, field HC 2 504 includes data indicative of the health of peripheral component electrical circuit 2, on to field HC N 506 having data indicative of the health of peripheral component electrical circuit N. The fields may be combined and/or read as a whole to indicate a state of the peripheral component existing at the time of a failure during operation of the peripheral component.

FIG. 5 illustrates a single-level multi-field data structure. The number of fields and levels may be more or less depending on the desired amount of error information selected for recording and depending on the particular peripheral component number of electrical circuits selected for monitoring. In one aspect, each field may be representative of the health of a particular peripheral component electrical circuit. In another aspect, a single field may be used to represent the health of the peripheral component. In yet another aspect, the several fields may be combined to represent the health of the several peripheral component electrical circuits. And in another aspect, the several fields may be combined to represent the health of the peripheral component. The above aspects are provided to illustrate examples of data structures and uses within the scope of the disclosure and the examples are to be considered non-exhaustive and non-limiting.

Other embodiments may be realized given the description of the general concepts and particular embodiments of the present disclosure provided above and with reference to the several drawings. For example, according to another aspect of the invention the PCI express SMBUS 226 or an I²C input/output expander, which is similar in architecture and operation to a SMBUS, is polled by firmware programmed instructions, which monitor the bus to for the aggregation logic circuit feedback signal to determine whether for a fault or error occurs. An I²C expander typically uses two bidirectional open-collector lines, serial data line (SPA) and serial clock line (SCL). These lines are normally pulled high with resistors.

According to another aspect, a PCIe Present pin on the connector 212 may be related to the DC to DC converter power goods using the aggregation logic circuit. For example, a feedback signal to the hot plug controller may be used to determine whether a signal on the card presence pin indicates that the card is removed even though it is physically there. The platform controller may then declare a fault and remove power to the connector 212 slot as if looking for a next insertion event.

According to another aspect, a JTAG test data out (TDO) pin may be used to convey a feedback signal from an aggregation logic circuit to monitor a PCIe adapter. JTAG is an acronym for Joint Test Action Group and is a name used for the IEEE 1149.1 standard for test access ports entitled "Standard Test Access Port and Boundary-Scan Architecture." The standard is used for testing printed circuit boards or systems using boundary scan. All planar devices do not connect the TDO and using the TDO for monitoring health of the PCIe would not affect other cards using JTAG connected to a controller.

The present disclosure is to be taken as illustrative rather than as limiting the scope or nature of the claims below. Numerous modifications and variations will become apparent to those skilled in the art after studying the disclosure, including use of equivalent functional and/or structural substitutes for elements described herein, use of equivalent functional couplings for couplings described herein, and/or use of equivalent functional actions for actions described herein. Such insubstantial variations are to be considered within the scope of the claims below.

Given the above disclosure of general concepts and specific embodiments, the scope of protection is defined by the claims appended hereto. The issued claims are not to be taken as limiting Applicant's right to claim disclosed but not yet literally claimed subject matter by way of one or more further applications including those filed pursuant to the laws of the United States and/or international treaty.

What is claimed is:

1. An apparatus for monitoring the health of a peripheral component of an information handling system, the apparatus comprising:
   a peripheral component comprising a plurality of electrical circuits;
   a connector for supplying power to the peripheral component;
   an aggregation logic circuit in communication with the plurality of electrical circuits, the aggregation logic circuit operable to provide a feedback signal;
   a platform controller in communication with the aggregation logic circuit, the platform controller operable to generate a platform control signal; and
   a plurality of power rails, each operable to assert a power good, in communication with the plurality of electrical circuits and the aggregation logic circuit, wherein the feedback signal is representative of an aggregation of power goods asserted by the plurality of power rails, and wherein the platform control signal removes power supplied to the peripheral component via the connector if at least one of the plurality of power rails fails to assert a power good.

2. An apparatus according to claim 1, wherein the peripheral component comprises a PCI express device.

3. An apparatus according to claim 1, wherein the feedback signal is transmittable to the platform controller.

4. An apparatus according to claim 3, wherein the platform controller operates to generate a platform control signal that, during operation, controls electrical power supplied to the peripheral component.

5. An apparatus according to claim 3 further comprising a memory device in data communication with at least one of i) the information handling system platform controller and ii) the aggregation logic circuit, the memory device configured to receive error information upon a failure of one or more of the plurality of power rails to assert a power good.

6. An apparatus according to claim 5, wherein the memory device is disposed on the peripheral component.

7. An apparatus according to claim 5, wherein the error information comprises data identifying a failed electrical circuit from the plurality of electrical circuits.

8. An apparatus according to claim 1, wherein the aggregation logic circuit resides on the peripheral component.

9. An apparatus according to claim 1 further comprising a latching circuit, wherein upon a failure of one or more of the plurality of electrical circuits the latching circuit operates to preserve information relating to the identification of the failed circuit, the information including identification of which power rail includes an out of range condition.

10. An apparatus according to claim 1, wherein the feedback signal is transmittable to an information handling system platform controller over a bi-directional communication path.

11. An apparatus according to claim 1 further comprising an interface that places the platform and the peripheral component in data communication.

12. An apparatus according to claim 1, wherein the information handling system generates a predetermined number of reset cycles prior to declaring a failure regarding the peripheral component.

13. An apparatus according to claim 1, wherein the plurality of electrical circuits are direct current to direct current (DC to DC) converters.

\* \* \* \* \*